(12) United States Patent
Warman et al.

(10) Patent No.: US 10,331,483 B1
(45) Date of Patent: Jun. 25, 2019

(54) SCHEDULING DATA ACCESS JOBS BASED ON JOB PRIORITY AND PREDICTED EXECUTION TIME USING HISTORICAL EXECUTION DATA

(71) Applicant: AMAZON TECHNOLOGIES, INC., Seattle, WA (US)

(72) Inventors: Leon Robert Warman, Kirkland, WA (US); Mark Austin Buckley, Seattle, WA (US); Bhavnish H. Lathia, Redmond, WA (US); Harsha Ramalingam, Kirkland, WA (US); Erik Warren Selberg, Seattle, WA (US); Robert Eicher Simmering, Bellevue, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 81 days.

(21) Appl. No.: 15/286,320

(22) Filed: Oct. 5, 2016

Related U.S. Application Data

(63) Continuation of application No. 13/926,752, filed on Jun. 25, 2013, now Pat. No. 9,477,523.

(51) Int. Cl.
*G06F 9/46* (2006.01)
*G06F 9/48* (2006.01)
*G06F 9/50* (2006.01)

(52) U.S. Cl.
CPC .......... *G06F 9/4887* (2013.01); *G06F 9/4837* (2013.01); *G06F 9/4881* (2013.01);
(Continued)

(58) Field of Classification Search
CPC .... G06F 9/4887; G06F 9/4881; G06F 9/5038; G06F 9/4837; G06F 9/5066; G06F 9/5011; G06F 9/4843
See application file for complete search history.

(56) References Cited

U.S. PATENT DOCUMENTS

| | | | |
|---|---|---|---|
| 6,591,287 B1 * | 7/2003 | More | G06F 9/4881 700/100 |
| 6,889,243 B1 * | 5/2005 | Hondou | G06F 9/4881 718/100 |

(Continued)

OTHER PUBLICATIONS

Ghaffari, Abu Z., "Advisory Action dated Apr. 6, 2016", U.S. Appl. No. 13/926,752, The United States Patent and Trademark Office, dated Apr. 6, 2016.

(Continued)

*Primary Examiner* — Abu Zar Ghaffari
(74) *Attorney, Agent, or Firm* — Lindauer Law, PLLC

(57) ABSTRACT

Techniques are described for scheduling data access jobs based on a job dependency analysis. Preliminary data access jobs subsequently accessed by a primary data access job are identified. Execution durations of the primary data access job and the preliminary data access jobs are determined based on historical data. A total execution duration of subsets of serially dependent preliminary data access jobs and predicted execution duration of primary data access job are determined. A time-sensitive subset is identified and start times for the data access job are scheduled. The results of the preliminary data access jobs are provided to the primary data access job prior to the start time of the primary data access job so the primary data access job completes by a target completion duration.

20 Claims, 8 Drawing Sheets

(52) U.S. Cl.
CPC .......... *G06F 9/5038* (2013.01); *G06F 9/4843* (2013.01); *G06F 9/5011* (2013.01); *G06F 9/5066* (2013.01)

(56) References Cited

U.S. PATENT DOCUMENTS

| | | | | |
|---|---|---|---|---|
| 7,089,071 | B2* | 8/2006 | Lilly | G06Q 10/06 700/100 |
| 7,516,458 | B2* | 4/2009 | Babutzka | G06F 9/5038 718/102 |
| 7,587,327 | B2* | 9/2009 | Jacobs | G06Q 10/02 705/7.14 |
| 8,255,860 | B1* | 8/2012 | Fung | G06F 17/505 716/108 |
| 8,381,219 | B2 | 2/2013 | Boris | |
| 8,387,066 | B1* | 2/2013 | Becher | G06F 9/4881 709/223 |
| 8,555,281 | B1* | 10/2013 | van Dijk | G06F 9/4881 718/100 |
| 8,583,467 | B1 | 11/2013 | Morris et al. | |
| 8,973,010 | B2 | 3/2015 | Haas et al. | |
| 9,477,523 | B1* | 10/2016 | Warman | G06F 9/4887 |
| 2005/0149219 | A1* | 7/2005 | Lilly | G06Q 10/06 700/100 |
| 2007/0294695 | A1 | 12/2007 | Jensen et al. | |
| 2008/0195849 | A1* | 8/2008 | Gonzalez | G06F 9/3009 712/223 |
| 2009/0070772 | A1* | 3/2009 | Shikano | G06F 9/5027 718/106 |
| 2009/0133027 | A1 | 5/2009 | Gunning et al. | |
| 2009/0158287 | A1* | 6/2009 | Cardelli | G06F 9/5038 718/102 |
| 2009/0158294 | A1* | 6/2009 | Perticara' | G06F 9/5038 718/106 |
| 2009/0210878 | A1 | 8/2009 | Huang | |
| 2009/0288088 | A1 | 11/2009 | Orii | |
| 2010/0153955 | A1* | 6/2010 | Sirota | G06F 9/485 718/102 |
| 2010/0306585 | A1* | 12/2010 | Richter | G06F 9/4843 714/16 |
| 2011/0055479 | A1* | 3/2011 | West | G06F 9/4881 711/118 |
| 2011/0161959 | A1* | 6/2011 | Sharon | G06F 9/4843 718/101 |
| 2012/0017262 | A1 | 1/2012 | Kapoor et al. | |
| 2012/0159494 | A1 | 6/2012 | Shafiee et al. | |
| 2012/0159499 | A1* | 6/2012 | Shafiee | G06F 9/5011 718/103 |
| 2012/0265570 | A1 | 10/2012 | Hegazi | |
| 2012/0331476 | A1* | 12/2012 | Saffre | G06F 9/5038 718/104 |
| 2013/0339972 | A1* | 12/2013 | Zhang | G06F 9/5066 718/104 |
| 2014/0215487 | A1 | 7/2014 | Cherkasova et al. | |
| 2014/0289733 | A1 | 9/2014 | Fritz et al. | |
| 2014/0344813 | A1 | 11/2014 | Jamjoom et al. | |

OTHER PUBLICATIONS

Ghaffari, Abu Z., "Final Office Action dated Jan. 22, 2016", U.S. Appl. No. 13/926,752, The United States Patent and Trademark Office, dated Jan. 22, 2016.

Ghaffari, Abu Z., "Non-Final Office Action dated Jun. 5, 2015", U.S. Appl. No. 13/926,752, The United States Patent and Trademark Office, dated Jun. 5, 2015.

Ghaffari, Abu Z., "Notice of Allowance dated Jun. 28, 2016", U.S. Appl. No. 13/926,752, The United States Patent and Trademark Office, dated Jun. 28, 2016.

\* cited by examiner

SCHEDULING DATA ACCESS JOBS BASED ON JOB PRIORITY AND PREDICTED EXECUTION TIME USING HISTORICAL EXECUTION DATA

PRIORITY

This application is a continuation of, and claims priority to, pending U.S. patent application Ser. No. 13/926,752 filed on Jun. 25, 2013, entitled "Scheduling Data Access Jobs Based On Job Priority And Predicted Execution Time Using Historical Execution Data." The entirety of this previously filed application is hereby incorporated by reference.

BACKGROUND

Commercial enterprises and other organizations often store large amounts of data related to their operations. For example, an online business may store data describing products, sale transactions, customers, vendors, online activities of customers, and so forth. Data retrieval, update, or analysis jobs may be requested by internal or external data consumers. The scheduling of such jobs may be a challenge given the large quantity of data to be processed, the available computational resources, the available storage capacity, various quality-of-service considerations, or other factors.

Figure 1:
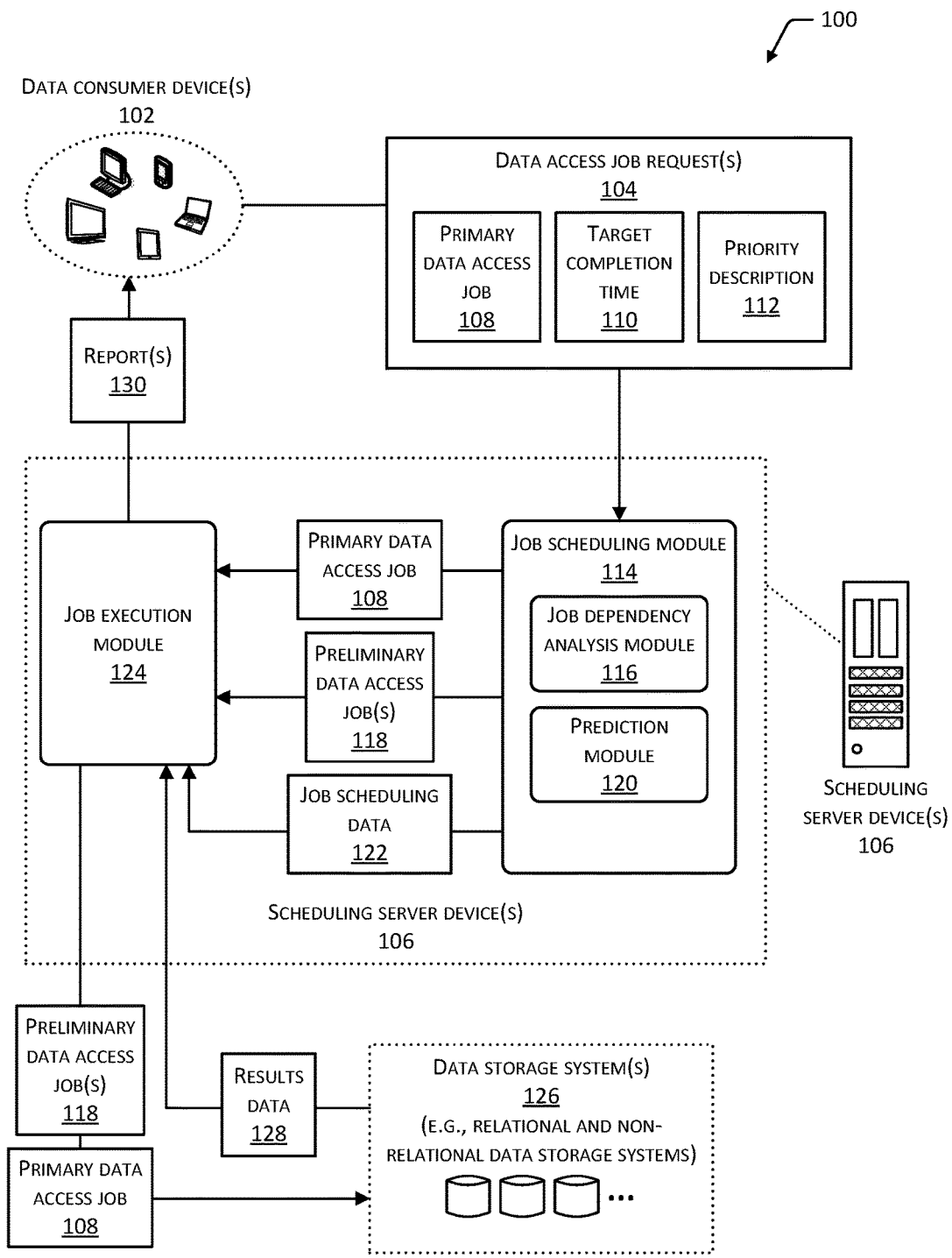
FIG. 1 depicts an environment for scheduling data access jobs based on a job dependency analysis, including one or more scheduling server devices to schedule and execute data access jobs to access data stored on one or more data storage systems.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes implementations of systems, devices, methods, and computer-readable media for scheduling data access jobs based at least partly on dependencies between such jobs. In implementations, one or more job requests are received from data consumers, such as users, devices, or processes. Each job request may include a primary data access job, a requested completion time for the primary data access job, and a priority description for the primary data access job. The primary data access job may be analyzed to determine one or more preliminary data access jobs that execute prior to the primary data access job. In some cases, the preliminary data access jobs may create or modify data that is subsequently accessed by the primary data access job. Accordingly, the primary data access job may depend on prior execution or completion of the preliminary data access jobs. An execution duration may be predicted for the primary data access job and for each of the preliminary data access jobs, based on historical data describing prior executions of the jobs.

One or more subsets of the preliminary data access jobs may be determined, each subset including a chain of serially dependent jobs that is preliminary to the primary data access job. Each subset may be characterized by a total execution duration that is a sum of the predicted execution durations of the associated primary data access job and the preliminary data access jobs in the subset. For each subset, a time difference may be calculated as the time difference (e.g., the predicted slack time or buffer time) between the requested completion time of the primary data access job and the total execution duration.

A time-sensitive (e.g., critical) subset may be identified from among the one or more subsets, the time-sensitive subset being the subset having a smallest time difference among the various subsets associated with a primary data access job. For example, a primary data access job may be associated with two subsets of preliminary data access jobs, the two subsets associated with a total execution duration of 3 and 5 hours respectively. If the primary data access job has a target completion time of 05:30 a.m., and the jobs may be scheduled to start no earlier than midnight, then 5.5 hours is the total time available for execution of the primary data access job and its preliminary data access jobs. In such cases, the second subset associated with the total execution duration of 5 hours may be selected as the time-sensitive subset, given that its time difference of 0.5 hours is the smallest among the subsets.

The preliminary data access jobs and the primary data access job may be scheduled for execution, with priority given to one of more of the preliminary data access jobs in the time-sensitive subset. In this way, implementations may increase the likelihood that a primary data access job completes at a time corresponding to or prior to its requested completion time.

As used herein, a data access job (or a job) describes a task or a set of tasks to retrieve, analyze, modify, process, or otherwise access data stored in one or more data storage systems. A data access job may include one or more queries to retrieve stored data, or to modify or create data that is subsequently stored. A data access job may also include any number of processes to analyze, summarize, correlate, or otherwise manipulate data. A data access job may be executed any number of times, at times that may be scheduled according to implementations described herein. A data access job may be scheduled to execute once, to execute periodically (e.g., nightly, weekly, monthly, and so forth), or to execute multiple times on any day or at any time. The execution of a data access job may result in creation or modification of data that is subsequently accessed by other data access jobs, or by the same data access job. In some cases, such as where the data access job is a primary data access job requested by a data consumer, the execution of the data access job may result in a report that is sent to one or more data consumers.

FIG. 1 depicts an environment 100 for scheduling data access jobs based on a job dependency analysis. The environment 100 may include one or more data consumer devices 102. The data consumer device(s) 102 may include any type of computing device, including but not limited to a smartphone, a tablet computer, a wearable computer, an implanted computer, a mobile gaming device, an electronic book reader, an automotive computer, a desktop computer, a personal computer, a laptop computer, a thin client, a terminal, a game console, a smart appliance, a home entertainment device, a mainframe computer, a server computer, a network computer, a cloud computing device, and so forth.

The data consumer device(s) 102 may be employed by data consumers or other entities to generate one or more data access job requests 104. As used herein, data consumers may include individuals, processes, devices, or any groups of individuals, processes, or devices. In some cases, data consumers may be associated with a business or other type of organization. The data consumers may consume data for any purposes, such as to develop processes, systems, services, or products, to analyze or improve business or organizational operations, or for other purposes.

The data consumer device(s) may communicate with one or more scheduling server device(s) 106, to send the data access job request(s) 104 to the scheduling server device(s) 106. The scheduling server device(s) 106 may include any type of computing device, including but not limited to a mainframe computer, a server computer, a network computer, a cloud computing device, and so forth. An example of the scheduling server device(s) 106 is described further with reference to FIG. 2.

One or more data consumers may use the data consumer device(s) 102 to generate the data access job request(s) 104, and provide the data access job request(s) 104 to the scheduling server device(s) 106. The data access job request 104 may include a primary data access job 108 that is to be executed to generate a report for the requesting data consumer or other data consumers. The data access job request 104 may also include a target completion time 110, indicating a requested time when the execution of the primary data access job is to be completed. The target completion time 110 may indicate a time of day, a particular day or date, or a combination of day and time. The target completion time 110 may comprise a request by the data consumer that the primary data access job 108 is completed at or before the target completion time 110.

In some cases, the data access job request 104 may also include a priority description 112 indicating a priority level or level of importance for the primary data access job 108. In some cases, the priority description 112 may identify one of a number of priority categories such as high, medium, or low priority. The priority description 112 may also include a numerical priority value on a priority scale. For example, a priority description 112 of 90 may indicate a substantially high priority on a scale of 0 to 100 where 100 is the highest priority. In some cases, the target completion time 110 and the priority description 112 may constitute a service level or service quality requested by the data consumer for delivery of a report including data retrieved or generated by the primary data access job 108. An organization may have a goal of substantially meeting or surpassing the service levels requested in the data access job request(s) 104 submitted by data consumers.

In some implementations, the data access job request(s) 104 may be received by a job scheduling module 114 executing on the scheduling server device(s) 106. The job scheduling module 114 may include a job dependency analysis module 116, which analyzes the primary data access job 108 to determine one or more preliminary data access jobs 118. The preliminary data access job(s) 118 may include data access jobs that create or modify data that is accessed by the primary data access job 108, such that the primary data access job 108 depends on a prior execution or completion of the preliminary data access job(s) 118. In some cases, the job dependency analysis module 116 may determine that the primary data access job 108 is not associated with any preliminary data access jobs 118.

In some implementations, the job dependency analysis module 116 may determine dependency relationships between the preliminary data access job(s) 118 and the primary data access job 108 based on historical data describing at least one previous execution of the primary data access job 108 and the preliminary data access job(s) 118. In implementations where the data access job request includes the priority description 112, the priority description 112 may be applied to one or more of the preliminary data access jobs(s) 118 that are identified as preliminary to the primary data access job 108.

Although the examples herein describe a data access job as either a preliminary data access job 118 or a primary data access job 108, implementations are not so limited. For example, in some cases a primary data access job 108 may be primary with respect to a particular data access job request 104, but may also be a preliminary data access job 118 with respect to another primary data access job 108.

The job scheduling module 114 may also include a prediction module 120, which predicts execution durations for the primary data access job 108 and the preliminary data access job(s) 118. The predicted execution duration for a data access job may include a time period between a start and a completion of the data access job, and may be expressed in any units such as fractions of seconds, seconds, minutes, hours, days, and so forth. The prediction module 120 may predict an execution duration for a data access job to any degree of accuracy, and may include a margin of error or uncertainty measure with its prediction. For example, the prediction module 120 may predict that a future execution of a data access job may take one hour to complete with a 25% margin of error, such that the execution duration is predicted as a range from 45 to 75 minutes. In some implementations, the prediction of the expected duration for one or more data access jobs may be based on historical data describing at least one previous execution of the data access job(s).

Based at least in part on the results of the dependency analysis and the expected duration predictions, the job scheduling module 114 may schedule the primary data access job 108 and the preliminary data access job(s) 118 for execution. The results of the scheduling may be described in job scheduling data 122. The job scheduling data 122 may include a scheduled start time for one or more of the preliminary data access job(s) 118, and may include a scheduled start time for the primary data access job 108. In some cases, the start times may be indicated as time differences relative to a base time on one or more days. For example, the start times may be indicated relative to midnight. Operations of the job scheduling module 114 are described further with reference to FIGS. 3-8.

The primary data access job 108, the preliminary data access job(s) 118, and the job scheduling data 122 may be provided to a job execution module 124 executing on the scheduling server device(s) 106. The job execution module 124 may execute each of the preliminary data access job(s) 118 and the primary data access job 108, according to the job scheduling data 122, to access data stored in one or more data storage systems 126. In some cases, the job execution module 124 may execute a data access job, or may launch a process that executes a data access job. Alternatively, the job execution module 124 may send a message to another module executing on the scheduling server device(s) 106 or on another device, the message instructing the other module to execute the data access job.

The data access job(s) may be executed to create, modify, retrieve, or otherwise access data stored in the data storage system(s) 126. The data storage system(s) 126 may comprise one or more datastores, data storage nodes, or databases that employ hardware components, software components, or any combination of hardware and software components to store data and provide access to the stored data from other devices. The data storage system(s) 126 may store any type of structured or unstructured data in any type of storage format, using any type of data storage technology. In some cases, the data storage system(s) 126 may include one or more processors or computing devices to perform actions for data storage, retrieval, and modification. Alternatively, the data storage system(s) 126 may be controlled by processors or computing devices not included in the data storage system(s) 126. In some cases, the data storage system(s) 126 may store large amounts of data, on the order of petabytes, exabytes, or greater. The data storage system(s) 126 may be subject to a high frequency of updates, for example hundreds of millions of updates daily.

The data storage system(s) 126 may include relational databases. As used herein, a relational data storage system describes a data storage system that employs a relational storage format including one or more formally described tables, each table including one or more columns associated with data attributes. In such cases, the data storage system(s) 126 may be managed through a relational database management system (RDBMS). The data storage system(s) 126 may include any number of relational databases, including but not limited to databases managed through any of the following: Oracle® and MySQL®, from Oracle Corporation® of Redwood City, Calif.; DB2®, from International Business Machines® (IBM) Corporation of Armonk, N.Y.; Linter®, from the RELEX Group® of Voronezh, Russia; Microsoft Access® and Microsoft SQL Server®, from Microsoft Corporation® of Redmond, Wash.; PostgreSQL®, from the PostgreSQL Global Development Group; and SQLite®, from D. Richard Hipp.

The data storage system(s) 126 may also include non-relational data storage systems. As used herein, a non-relational data storage system describes a data storage system that employs a non-relational data storage format, such as a "not only SQL" (NoSQL) database that does not adhere to a relational database model. Non-relational data storage systems may employ a hierarchical database model or a network database model. Non-relational data storage systems may also include key-value datastores, hash tables, flat files, associative arrays, other types of data structures, or unstructured data storage. In some cases, non-relational data storage systems may store metadata describing data attributes or other aspects of the stored data. Non-relational data storage systems may include any number of non-relational databases, including but not limited to databases managed through any of the following: FoxPro® database management system, from Microsoft Corporation® of Redmond, Wash.; ParAccel® Analytic Database, from ParAccel, Incorporated® of San Diego, Calif.; and Hadoop®, from the Apache Software Foundation®.

Each of the data storage system(s) 126 may support one or more native query languages for performing data read and write operations. For example, relational data storage systems may support a version of the Structured Query Language (SQL). As another example, non-relational data storage systems may support queries in the Hadoop Query Language (HQL), MapReduce, or other query languages.

In some cases, the preliminary data access job(s) 118 may be executed prior to the primary data access job 108, to modify or create the data that is subsequently accessed during execution of the primary data access job 108. Results data 128 may be generated based on the execution of the primary data access job 108. The results data 128 may be received by the job execution module 124, or by another module of the scheduling server device(s) 106. The job execution module 124 or another module may then generate one or more reports 130 based on the results data 128, and send the report(s) 130 to one or more data consumers. The report(s) 130 may be provided in any format or structure, or as unstructured data, and may be provided through any delivery mechanism.

The various devices of the environment 100 may communicate with one another using one or more networks. Such networks may include public networks such as the Internet, private networks such as an institutional or personal intranet, or some combination of private and public networks. The networks may include any type of wired or wireless network, including but not limited to local area networks (LANs), wide area networks (WANs), wireless WANs (WWANs), wireless LANs (WLANs), and mobile communications networks (e.g. 3G, 4G, and so forth).

Figure 2:
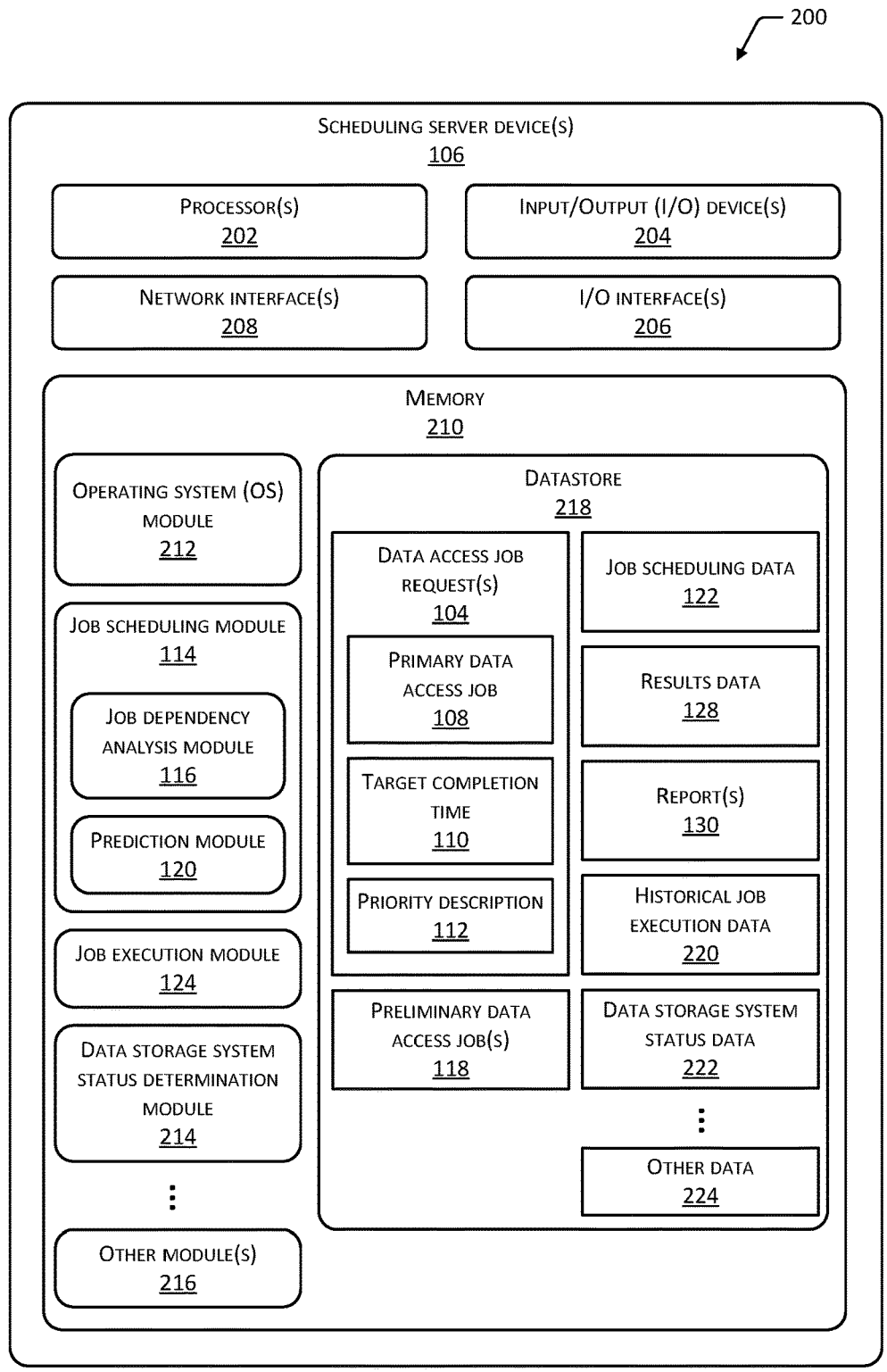
FIG. 2 depicts a block diagram of an example scheduling server device configured to perform operations for scheduling and executing data access jobs.

FIG. 2 depicts a block diagram 200, depicting an example system architecture for the scheduling server device(s) 106 shown in FIG. 1. As shown in block diagram 200, the scheduling server device(s) 106 may include one or more processors 202 configured to execute one or more stored instructions. The processor(s) 202 may comprise one or more cores.

The scheduling server device(s) 106 may include one or more input/output (I/O) devices 204. The I/O device(s) 204 may include user input devices such as a keyboard, a mouse, a pen, a game controller, a voice input device, a touch input device, a gestural input device, a haptic input device, or other devices. The I/O device(s) 204 may also include output devices such as a display, a printer, audio speakers, haptic output devices, and so forth. The I/O device(s) 204 may be physically incorporated with the scheduling server device(s) 106, or may be externally placed.

The scheduling server device(s) 106 may include one or more I/O interfaces 206 to enable components or modules of the scheduling server device(s) 106 to control, interface with, or otherwise communicate with the I/O device(s) 204. The I/O interface(s) 206 may enable information to be transferred in or out of the scheduling server device(s) 106, or between components of the scheduling server device(s) 106, through serial communication, parallel communication, Ethernet, or other types of communication. For example, the I/O interface(s) 206 may comply with the RS-232 standard for serial ports, or with the Institute of Electrical and Electronics Engineers (IEEE) 1284 standard for parallel ports. As another example, the I/O interface(s) 206 may be configured to provide a Universal Serial Bus (USB) connection. The scheduling server device(s) 106 may also include one or more busses or other internal communications hardware or software that allow for the transfer of data between the various modules and components of the scheduling server device(s) 106.

The scheduling server device(s) 106 may include one or more network interfaces 208 to enable communications between scheduling server device(s) 106 and other networked devices, such as the data consumer device(s) 102 or the data storage system(s) 126. The network interface(s) 208 may include one or more network interface controllers (NICs) or other types of transceiver devices configured to send and receive communications over a network.

The scheduling server device(s) 106 may include one or more memories, described herein as memory 210. The memory 210 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 210 provides storage of computer-readable instructions, data structures, program modules, and other data for the operation of the scheduling server device(s) 106.

The memory 210 may include an operating system (OS) module 212. The OS module 212 is configured to manage hardware resources such as the I/O device(s) 204, the I/O interface(s) 206, and the network interface(s) 208, and to provide various services to applications, processes, or modules executing on the processor(s) 202. The OS module 212 may include one or more of the following: any version of UNIX®, originally developed at Bell Laboratories, including any version of the Linux® operating system originally released by Linus Torvalds, any version of BSD UNIX originally developed at the University of California, Berkeley, Solaris® originally developed by Sun Microsystems® of Santa Clara, Calif., HP-UX® developed by Hewlett-Packard Co.® of Palo Alto, Calif., AIX® developed at IBM®, and others; any version of iOS® from Apple Corp.® of Cupertino, Calif.; any version of Windows® or Windows Mobile® from Microsoft Corp.® of Redmond, Wash.; any version of Android® from Google, Corp.® of Mountain View, Calif. and its derivatives from various sources; any version of Palm OS® from Palm Computing, Inc.® of Sunnyvale, Calif. and its derivatives from various sources; any version of BlackBerry OS® from Research In Motion Ltd.® of Waterloo, Ontario, Canada; any version of VxWorks® from Wind River Systems® of Alameda, Calif.; or other operating systems.

In some implementations, the memory 210 includes the job scheduling module 114, which performs operations to schedule one or more data access jobs as described herein. The job scheduling module 114 may include the job dependency analysis module 116 and the prediction module 120. Alternatively, one or both of the job dependency analysis module 116 and the prediction module 120 may operate as a separate module relative to the job scheduling module 114. The memory 210 may also include the job execution module 124. The operations of the job scheduling module 114 and the job execution module 124 are described further with reference to FIGS. 3-8.

In some implementations, the memory 210 may include a data storage system status determination module 214. The data storage system status determination module 214 may collect information regarding the status of one or more of the data storage system(s) 126. Such information may include a current operational status of the data storage system(s) 126, such as whether they are currently available to execute data access jobs, or a current operational load expressed as an amount of processor being used, an amount of memory being used by executing processes, an amount of storage used and available, and so forth. Such information may also include historical data indicating a prior status of the data storage system(s) 126 at one or more times in the past. The information may also describe the number, the type, and information identifying the data access jobs that are currently running or that were previously run, how long they have been running, or a duration of completed execution(s). The data storage system status determination module 214 may poll the data storage system(s) 126 to request information regarding their current or historical status. Alternatively, the data storage system status determination module 214 may receive status information from the data storage system(s) 126 without polling them. In some implementations, the status information may be employed to determine one or more data storage systems 126 on which to execute data access jobs, or to modify or adjust the execution of data access jobs in real time, as described further with reference to FIG. 8.

The memory 210 may also include one or more other modules 216, such as a user authentication module, an access control module, a security or cryptography module, and so forth.

The memory 210 may include a datastore 218 to store information for operations of the scheduling server device(s) 106. The datastore 218 may comprise a database, array, structured list, tree, or other data structure, and may be a relational or a non-relational datastore. The datastore 218 may store the data access job request(s) 104, including the primary data access job 108, the target completion time 110, and the priority description 112. The datastore 218 may also store the preliminary data access job(s) 118, the job scheduling data 122, the results data 128, and the report(s) 130.

In some implementations, the datastore 218 may store historical job execution data 220 describing one or more previous executions of data access jobs. The historical job execution data 220 may be employed in identifying the preliminary data access job(s) 118 on which a primary data access job 108 depends. The historical job execution data 220 may also be employed to predict execution durations of data access jobs, as described further with reference to FIG. 6. In some implementations, the datastore 218 may store data storage system status data 222 generated by the data storage system status determination module 214 as described above. The datastore 218 may also store other data 224, such as user account information, user authentication information, and so forth. In some implementations, at least a portion of the information stored in the datastore 218 may be stored externally to the scheduling server device(s) 106, on other devices that are in communication with the scheduling server device(s) 106 via the I/O interface(s) 206 or the network interface(s) 208.

Figure 3:
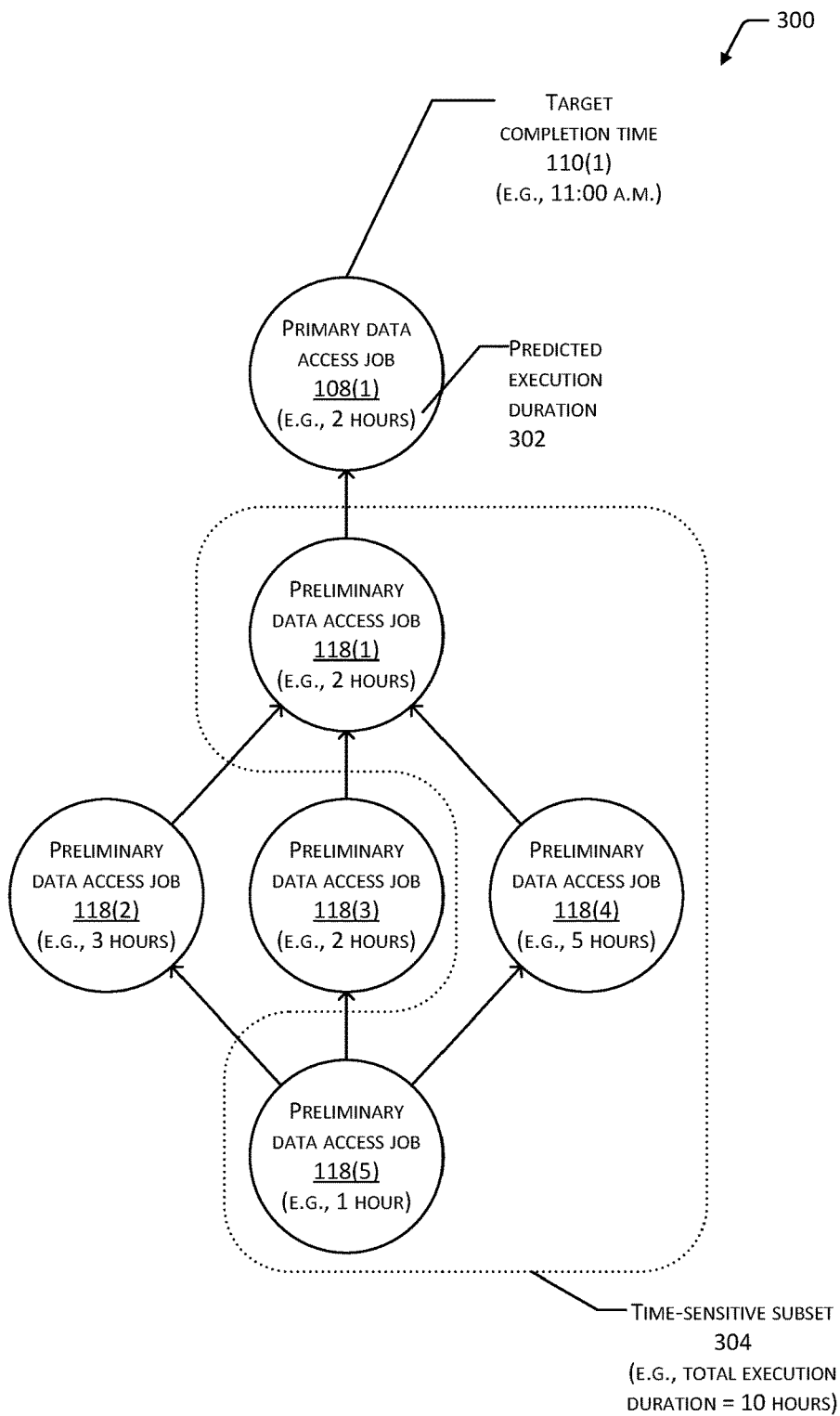
FIG. 3 depicts a schematic of a primary data access job that depends on multiple preliminary data access jobs, including preliminary data access jobs that are serially dependent.

FIG. 3 depicts a schematic 300, showing an example of a primary data access job 108(1) that depends on multiple preliminary data access jobs 118, including preliminary data access jobs 118 that are serially dependent. In FIG. 3, the lines connecting the data access jobs indicate that one data access job is dependent on one or more other data access jobs. In such cases, the data access job may not successfully execute until the other data access jobs on which it depends have executed. In FIG. 3, the arrowheads on the lines indicate a direction of the dependency between jobs. For example, the arrow pointing from the preliminary data access job 118(5) toward the preliminary data access job 118(2) indicates that the preliminary data access job 118(2) depends on the preliminary data access job 118(5).

The example of schematic 300 includes one primary data access job 108(1), as may be requested by a data access job request 104. The primary data access job 108(1) depends on one preliminary data access job 118(1). The preliminary data access job 118(1) depends on three other preliminary data access jobs 118(2), 118(3), and 118(4), which each depend on preliminary data access job 118(5). In the example shown, the preliminary data access job 118(5) does not depend on any other data access job.

For each of the data access jobs, including the primary data access job(s) 108 and the preliminary data access job(s) 118, a predicted execution duration 302 may be determined. Such a prediction may be based on historical data describing one or more previous executions of the data access job, on one or more characteristics of the data access job, on one or more characteristics of the data storage system(s) 126 on which the data access job was previously run, or on other factors. The predicted execution duration 302 may be determined by the prediction module 120, or some other module. Prediction of execution durations is described further with reference to FIG. 6. Although the examples in FIG. 3 show predicted execution durations 302 expressed in whole numbers of hours (e.g., 2 hours, 5 hours, and so forth), implementations may describe predicted execution durations 302 in terms of days, hours, minutes, seconds, fractions of seconds, or any combination thereof.

In some implementations, the preliminary data access job(s) 118 for a primary data access job 108, and the dependency relationships between the data access jobs, are analyzed to identify one or more subsets of the preliminary data access job(s) 118. Each subset may include one or more preliminary data access job(s) 118. In some implementations, each subset includes two or more serially dependent preliminary data access jobs 118 that constitute a chain of dependency leading to the primary data access job 108. Each possible chain of serially dependent preliminary data access jobs 118, e.g., each possible chain leading to the primary data access job 108, may correspond to a subset. In some cases, a subset may include a single preliminary data access job 118 that does not depend on another job.

For example, the schematic 300 shows three subsets of the preliminary data access jobs 118 each constituting a chain of dependency leading to the primary data access job 108(1). The first subset includes the preliminary data access job 118(1) which depends on the preliminary data access job 118(2) which depends on the preliminary data access job 118(5). The second subset includes the preliminary data access job 118(1) which depends on the preliminary data access job 118(3) which depends on the preliminary data access job 118(5). The third subset includes the preliminary data access job 118(1) which depends on the preliminary data access job 118(4) which depends on the preliminary data access job 118(5). Implementations support scenarios in which a primary data access job 108 is dependent on any number of preliminary data access jobs 118, and in which the preliminary data access jobs 118 include any number of subsets of serially dependent jobs.

For each subset, a total execution duration may be calculated as the sum of the predicted execution durations 302 of the primary data access job 108 and the preliminary data access jobs 118 in the subset. For example, the first subset described above has a total execution duration of 8 hours=2 hours+2 hours+3 hours+1 hour, the predicted execution durations 302 of the primary data access job 108(1) and the preliminary data access jobs 118(1), 118(2), and 118(5) respectively. The second subset described above has a total execution duration of 7 hours=2 hours+2 hours+2 hours+1 hour, the predicted execution durations 302 of the primary data access job 108(1) and the preliminary data access jobs 118(1), 118(3), and 118(5) respectively. The third subset described above has a total execution duration of 10 hours=2 hours+2 hours+5 hours+1 hour, the predicted execution durations 302 of the primary data access job 108(1) and the preliminary data access jobs 118(1), 118(4), and 118(5) respectively.

For each subset, a time difference may be calculated as the difference between the total execution duration and the amount of time available for executing the data access jobs, where the amount of time available is the time period from a baseline time (e.g., midnight) to the target completion time 110. Although the examples herein employ a baseline time of midnight (e.g., 00:00 a.m.), implementations are not so limited and may employ other baseline times. In the example of FIG. 3, the target completion time 110 for the primary data access job 108(1) is 11:00 a.m. Given that, the amount of time available for executing the primary data access job 108(1) and its preliminary data access jobs 118 is 11 hours, to ensure that the primary data access job 108(1) completes by its target completion time 110. Based on the total execution times calculated above for the three subsets in the example of FIG. 3, the time difference for the first subset is 3 hours=11 hours 8 hours, the time difference for the second subset is 4 hours=11 hours-7 hours, and the time difference for the third subset is 1 hour=11 hours-10 hours.

Based on the time difference calculation(s), a time-sensitive subset 304 may be identified as the subset having the smallest time difference among the multiple subsets. In the example of FIG. 3, the third subset may be identified as the time-sensitive subset 304 given its smallest time difference of 1 hour. The scheduling of the data access jobs may give priority to one or more of the preliminary data access jobs 118 included in the time-sensitive subset 304. The time-sensitive subset 304 may be described as a critical subset or a critical path, given that the serial execution of the data access jobs in this subset allows for the least amount of slack time or buffer time to meet the requested target completion time 110.

The various calculations described above for the three subsets are summarized in Table 1.

TABLE 1

| Subset | Total Execution Duration of Primary Data Access Job + Subset | Time Difference Between Available Time and Total Execution Duration |
| --- | --- | --- |
| Subset 1 = preliminary data access jobs 118(1), 118(2), and 118(5) | 2 + 2 + 3 + 1 = 8 hours | 11 hours − 8 hours = 3 hours |
| Subset 2 = preliminary data access jobs 118(1), 118(3), and 118(5) | 2 + 2 + 2 + 1 = 7 hours | 11 hours − 7 hours = 4 hours |
| Subset 3 = preliminary data access jobs 118(1), 118(4), and 118(5) | 2 + 2 + 5 + 1 = 10 hours | 11 hours − 10 hours = 1 hour |

The scheduling of the data access jobs in FIG. 3 may proceed as listed in Table 2, with priority given to the preliminary data access jobs 118 in the time-sensitive subset 304.

TABLE 2

| Data Access Job | Scheduled Time (for example baseline 00:00 a.m.) |
|---|---|
| Preliminary data access job 118(5) | 00:00 a.m. |
| Preliminary data access job 118(4) | 01:00 a.m. |
| Preliminary data access job 118(1) | 06:00 a.m. |
| Primary data access job 108(1) | 08:00 a.m. |

In the example of FIG. 3, the two other preliminary data access jobs 118(2) and 118(3) may be scheduled to execute at least partly in parallel with the preliminary data access job 118(4), between 01:00 a.m. and 06:00 a.m. These jobs may be scheduled to run in parallel with the preliminary data access job 118(4), either on the same data storage system 126 or on a different data storage system 126. The determination of a data storage system 126 on which to run the jobs may be based on a current status of the data storage systems 126, such as a current job load. In some cases, other jobs may not be scheduled to run in parallel with the preliminary data access job 118(4) on the same data storage system 126 to avoid inter-job contention that may prevent the preliminary data access job 118(4) from completing as scheduled. Such contention avoidance is described further with reference to FIG. 8.

Figure 4:
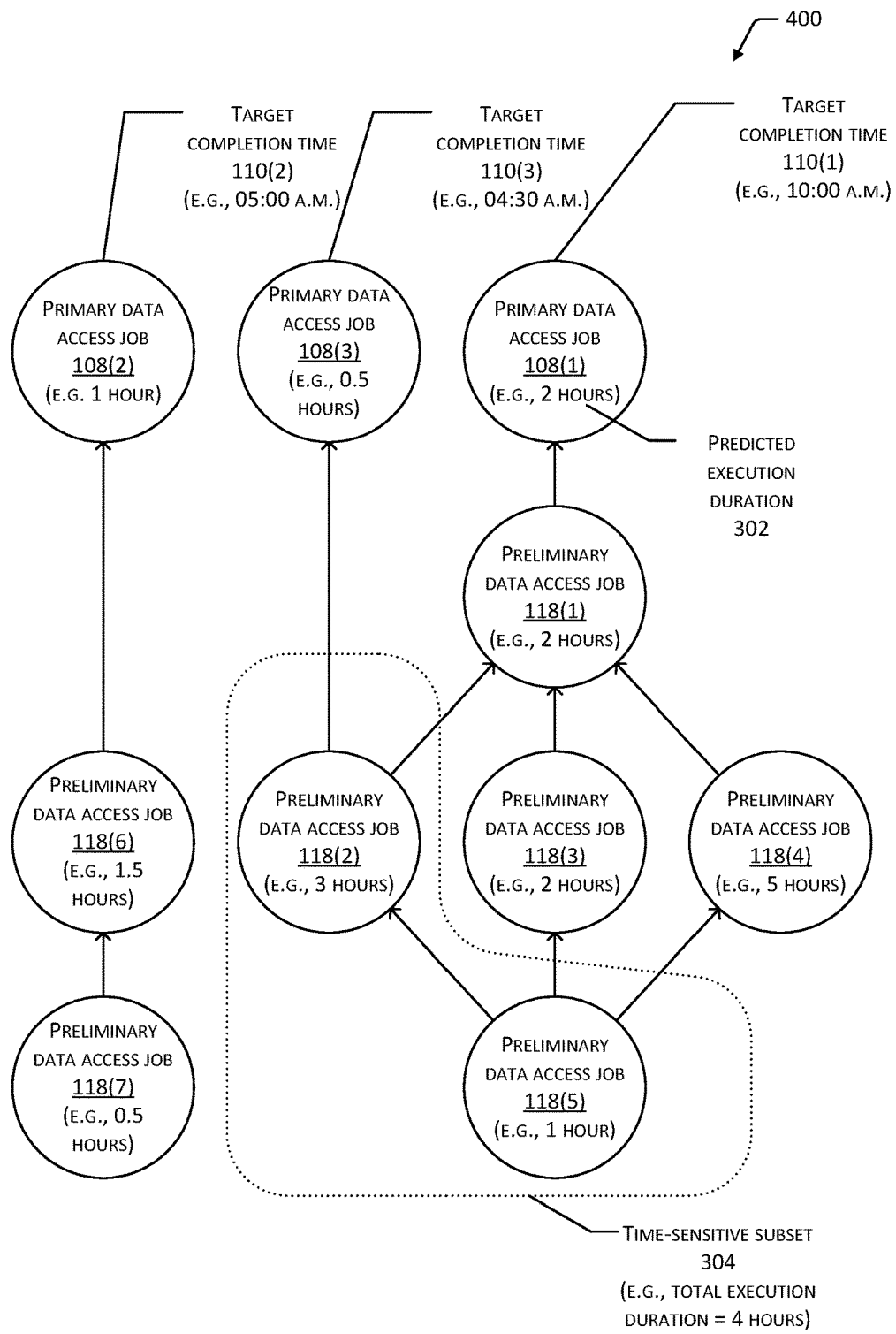
FIG. 4 depicts a schematic of multiple primary data access jobs that each depend on one or more preliminary data access jobs, including at least one preliminary data access job that is preliminary to multiple primary data access jobs.

FIG. 4 depicts a schematic 400, showing an example of multiple primary data access jobs 108 that each depend on one or more preliminary data access jobs 118, including at least one preliminary data access job 118 that is preliminary to multiple primary data access jobs 108. As in FIG. 3, the lines connecting the data access jobs indicate that one data access job is dependent on one or more other data access jobs, with the arrowheads indicating a direction of the dependency.

In the example of FIG. 4, two additional primary data access jobs 108 are added to the example of FIG. 3: primary data access job 108(2), with a target completion time 110(2) of 05:00 a.m. and a predicted execution duration 302 of 1 hour; and primary data access job 108(3), with a target completion time 110(3) of 04:30 a.m. and a predicted execution duration 302 of 0.5 hours. In the example of FIG. 4, two additional subsets have been added to those shown in FIG. 3. Subset 4 includes a chain of dependency that leads from the primary data access job 108(2) to the preliminary data access job 118(6) to the preliminary data access job 118(7). Subset 5 includes a chain of dependency that leads from the primary data access job 108(3) to the preliminary data access job 118(2) to the preliminary data access job 118(5). Table 3 summarizes the total execution duration and time difference calculations for the five subsets shown in FIG. 4.

TABLE 3

| Subset | Total Execution Duration of Primary Data Access Job + Subset | Time Difference Between Available Time and Total Execution Duration |
|---|---|---|
| Subset 1 = preliminary data access jobs 118(1), 118(2), and 118(5) | 2 + 2 + 3 + 1 = 8 hours | 11 hours − 8 hours = 3 hours |
| Subset 2 = preliminary data access jobs 118(1), 118(3), and 118(5) | 2 + 2 + 2 + 1 = 7 hours | 11 hours − 7 hours = 4 hours |
| Subset 3 = preliminary data access jobs 118(1), 118(4), and 118(5) | 2 + 2 + 5 + 1 = 10 hours | 11 hours − 10 hours = 1 hour |

TABLE 3-continued

| Subset | Total Execution Duration of Primary Data Access Job + Subset | Time Difference Between Available Time and Total Execution Duration |
|---|---|---|
| Subset 4 = preliminary data access jobs 118(6) and 118(7) | 1 + 1.5 + 0.5 = 3 hours | 5 hours − 3 hours = 2 hours |
| Subset 5 = preliminary data access jobs 118(2) and 118(5) | 0.5 + 3 + 1 = 4.5 hours | 4.5 hours − 4.5 hours = 0 hours |

In the example of FIG. 4, subset 5 may be identified as the time-sensitive subset 304, given that it has the smallest time difference (e.g., 0 hours or no slack time) among the subsets. The preliminary data access jobs 118 included in subset 5 may be prioritized during scheduling.

The scheduling of the data access jobs in FIG. 4 may proceed as listed in Table 4, with priority given to the preliminary data access jobs 118 in the time-sensitive subset 304.

TABLE 4

| Data Access Job | Scheduled Time (for example baseline 00:00 a.m.) |
|---|---|
| Preliminary data access job 118(5) | 00:00 a.m. |
| Preliminary data access job 118(2) | 01:00 a.m. |
| Primary data access job 108(3) | 04:00 a.m. |

In some implementations, the various subsets may be ordered from smallest to largest time difference, and the scheduling of their preliminary data access jobs 118 may be prioritized in that order. In the example of FIG. 4, the scheduling of the jobs in subset 5 (e.g., the time-sensitive subset 304) may be prioritized highest, followed by the jobs in subset 3, subset 4, subset 1, and subset 2, according to the ordering of the subsets from smallest to largest time difference. In this way, implementations may ensure that the data access jobs with less buffer time available for completion are given higher priority than other data access jobs that may allow more flexibility in their scheduling.

Figure 5:
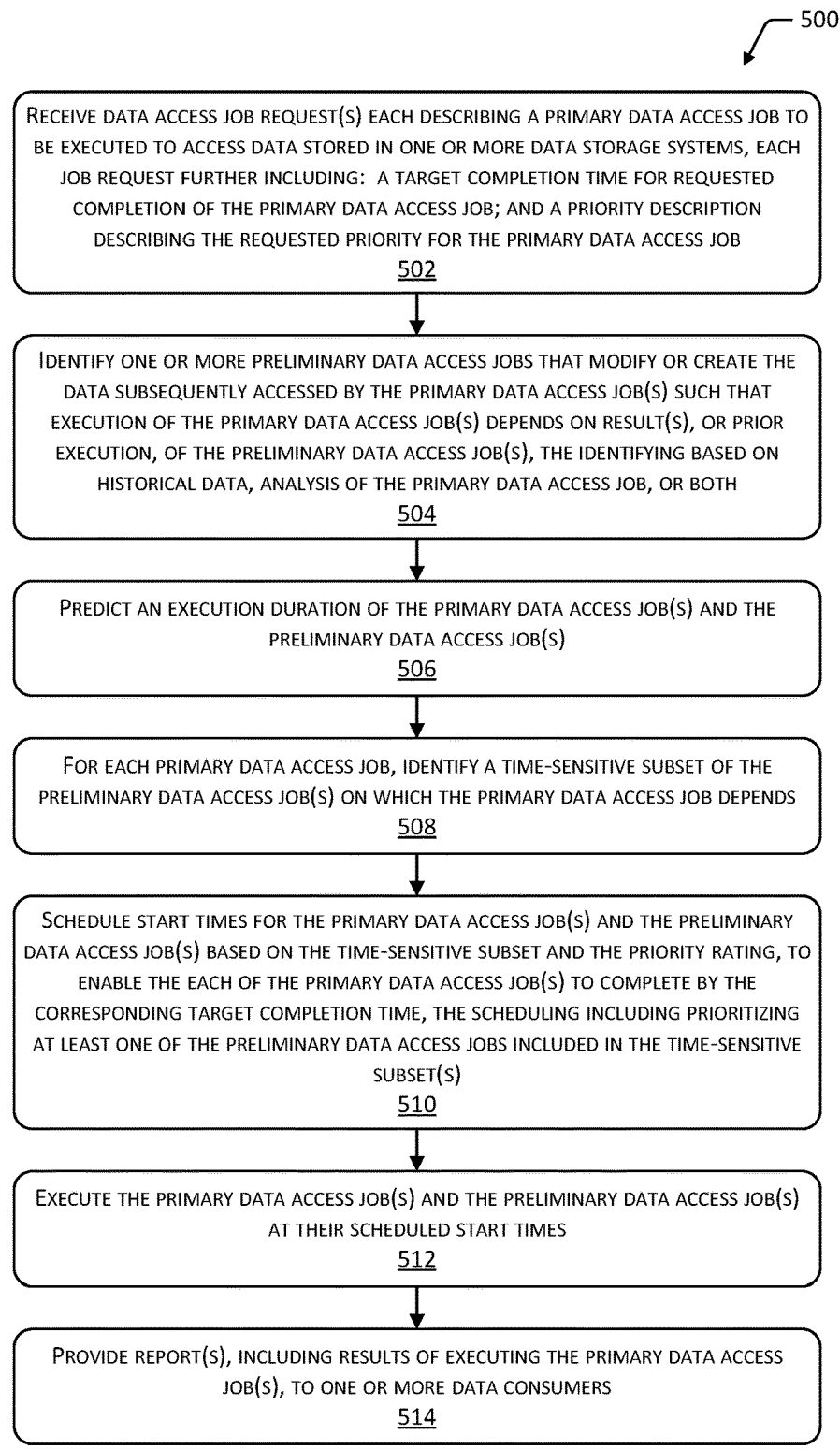
FIG. 5 depicts a flow diagram of a process for scheduling data access jobs based on job dependencies, and executing the data access jobs.

FIG. 5 depicts a flow diagram 500 of a process for scheduling data access jobs based on job dependencies, and executing the data access jobs. One or more operations of the process may be performed on the scheduling server device(s) 106, by the job scheduling module 114, the job dependency analysis module 116, the prediction module 120, the job execution module 124, or by other modules.

At 502, one or more data access job requests 104 are received, each data access job request 104 describing a primary data access job 108 to be executed to access data stored in the data storage system(s) 126. As described above, each data access job request 104 may also include a target completion time 110 for requested completion of the primary data access job 108. In some implementations, the data access job request 104 may also include a priority description 112, describing the requested priority for the primary data access job 108.

At 504, one or more preliminary data access jobs 118 are identified as associated with the primary data access job 108 included in the data access job request 104. As described above, the preliminary data access job(s) 118 may modify or create data that is subsequently accessed by the primary data access job 108. Accordingly, the execution of the primary data access job 108 may depend on results of the preliminary data access job(s) 118 or may otherwise depend on the prior execution of the preliminary data access job(s) 118. In some implementations, the identification of the preliminary data access job(s) 118 may be based on historical data describing at least one previous execution of the primary data access job 108 or the preliminary data access job(s) 118. For example, such historical data may indicate that the primary data access job 108 failed in cases where it was launched prior to completion of the preliminary data access job(s) 118.

Moreover, in some implementations the identification of the preliminary data access job(s) 118 may be based on an analysis of one or more of the primary data access job 108 or the data which is accessed by the primary data access job 108. For example, if it is determined that the primary data access job 108 accesses data attributes, data elements, or database columns that are populated or modified through execution of the preliminary data access job(s) 118, it may be inferred that the primary data access job 108 depends on prior execution of the preliminary data access job(s) 118. In some cases, both the historical data analysis and the analysis of the primary data access job 108 may be employed to identify the preliminary data access job(s) 118. Additionally, in some cases the data access job request 104 may indicate one or more preliminary data access jobs 118 on which the primary data access job 108 depends.

At 506, an execution duration 302 is predicted for one or more of the primary data access job 108 and the preliminary data access job(s) 118. Such prediction is further described with reference to FIG. 6.

At 508, in some implementations for each primary data access job 108 a time-sensitive subset 304 is identified that includes one or more of the preliminary data access job(s) 118 on which the primary data access job 108 depends. Such a determination may proceed as described above with reference to FIGS. 3 and 4, and is further described with reference to FIG. 7.

At 510, start times are scheduled for the primary data access job 108 and its associated preliminary data access job(s) 118. In some implementations the scheduling may be based at least partly on the time-sensitive subset 304 identified at 508. As described above with reference to FIGS. 3 and 4, the scheduling may include prioritizing one or more of the preliminary data access job(s) 118 that are included in the time-sensitive subset 304. In some implementations, the scheduling may be based on the priority description 112 included in the data access job request 104, with higher priority jobs scheduled earlier than other, lower priority jobs. In some implementations, the priority description may be applied first in determining the scheduling priority of the primary data access job 108 and its preliminary data access job(s) 118, with the determination of the time-sensitive subset 304 applied as a secondary criterion during scheduling. Alternatively, the determination of the time-sensitive subset 304 may be applied first, with the priority description 112 applied as a secondary criterion.

In some implementations, job scheduling may be based on an algorithm that schedules jobs within a particular subset based on their predicted durations and based on the target completion time 110 for the primary data access job 108. For example, as shown in FIG. 4 the primary data access job 108(2) corresponds to a target completion time 110(2) at 05:00 a.m., and has a predicted execution duration of 1 hour. Accordingly, the primary data access job 108(2) may be scheduled to begin execution at 04:00 a.m., the predicted execution duration prior to the target completion time 110(2). The preliminary data access job 118(6), on which the primary data access job 108(2) depends, has a predicted execution duration of 1.5 hours. Accordingly, the preliminary data access job 118(6) may be scheduled to begin execution at 02:30 a.m., such that it may complete its execution prior to the execution of the primary data access job 108(2). The preliminary data access job 118(7), on which the preliminary data access job 118(6) depends, has a predicted execution duration of 0.5 hours. Accordingly, the preliminary data access job 118(7) may be scheduled to begin execution at 02:00 a.m., such that it may complete its execution prior to the execution of the preliminary data access job 118(6). Thus, some implementations provide what may be described as a just-in-time scheduling of jobs, in which jobs may be scheduled as late as possible within a chain of dependent jobs while still providing sufficient time for the primary data access job 108 to complete by its target completion time 110. In some implementations, a first job may be scheduled such that a predetermined amount of time elapses between the scheduled start time of the first job and the predicted completion time of a second job on which the first job depends. In this way, implementations may ensure that the second job has completed prior to the scheduled launch of the first job.

At 512, each of the primary data access job(s) 108 and the preliminary data access job(s) 118 may be executed to access data stored in the data storage system(s) 126. The determination of particular data storage system(s) 126 on which to execute the jobs is described further with reference to FIG. 8. At 514, the report(s) 130 are provided to one or more data consumers, the report(s) 130 being based on the results data 128 resulting from the execution of the primary data access job(s) 108.

In some implementations, one or more of the operations 502, 504, 506, 508, or 510 may be performed prior to the execution of the primary data access job(s) 108 and the preliminary data access job(s) 118. For example, in cases where jobs are run daily the operations 502, 504, 506, 508, and 510 may execute at or near a predetermined time (e.g., 09:00 p.m. the previous day) prior to the designated start of the day (e.g., midnight). Accordingly, implementations provide for the analysis of job dependencies, prediction of job durations, and determination of job schedules prior to the launching of the jobs. In some implementations, one or more of the operations of FIGS. 5-8 may be performed for data access jobs that access data corresponding to a particular geographic region, a particular organization (e.g., business organization), a particular type of data (e.g., shipment data or order data), and so forth.

Figure 6:
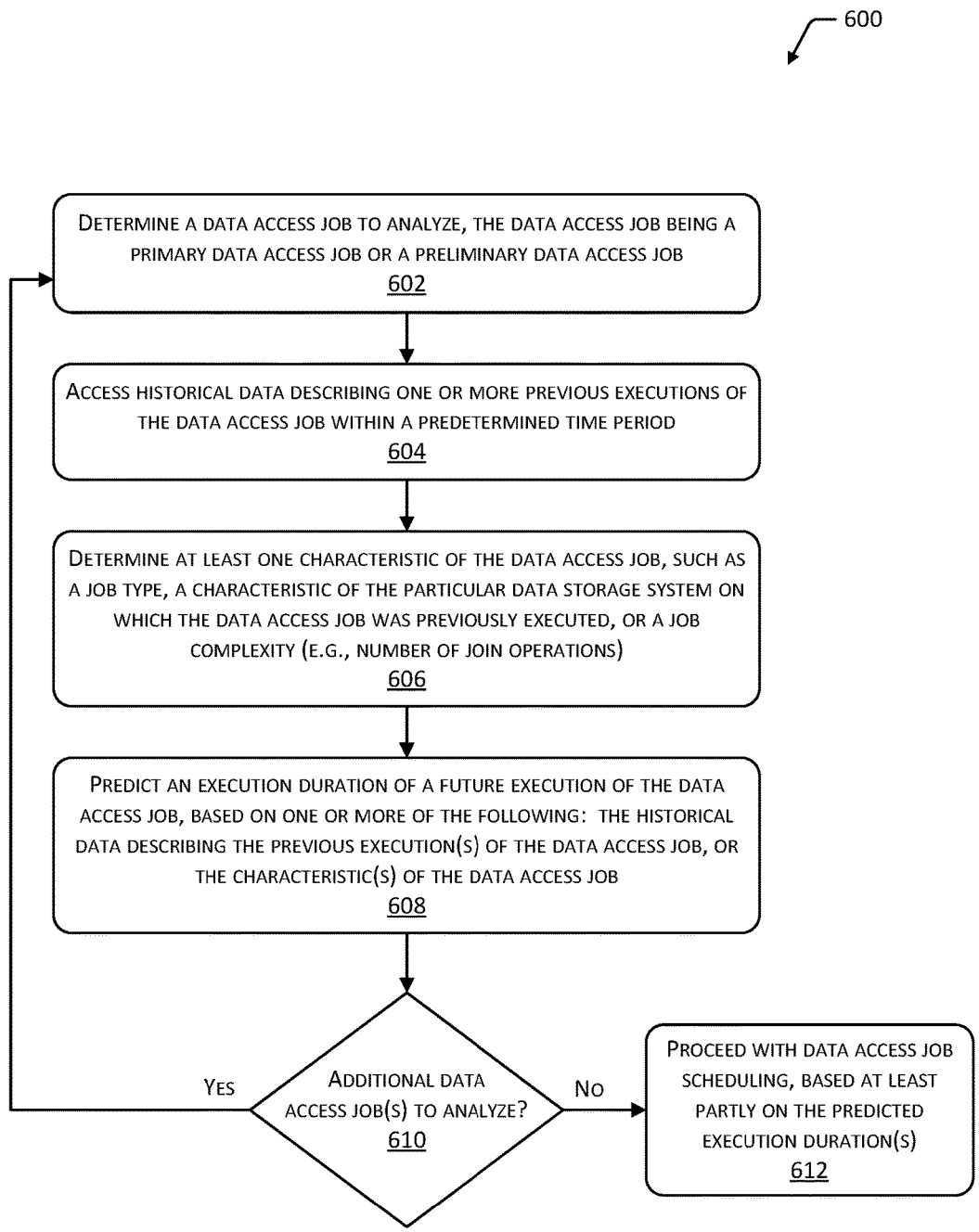
FIG. 6 depicts a flow diagram of a process for predicting execution durations of data access jobs.

FIG. 6 depicts a flow diagram 600 of a process for predicting execution durations of data access jobs. One or more operations of the process may be performed on the scheduling server device(s) 106, by the job scheduling module 114, the job dependency analysis module 116, the prediction module 120, the job execution module 124, or by other modules.

At 602, a determination is made of a data access job to be analyzed, the data access job being a primary data access job 108 or a preliminary data access job 118. At 604, historical data is accessed, the historical data describing one or more previous executions of the data access job. In some cases, the historical data may describe a predetermined number of previous executions of the data access job, such as the previous one or two executions. Alternatively, the historical data may describe the previous executions that occurred during a predetermined period of time, such as the executions that were performed during the previous week.

At 606, at least one characteristic of the data access job is determined. The characteristic(s) may include a job type such as the types of data accessed by the job, the particular data attributes, data elements, or columns accessed by the job, whether the job wrote new data or modified previously written data, and so forth. The characteristic(s) may also include a characteristic of the particular data storage system(s) 126 on which the job was previously executed, such as the storage technology or type of the data storage system, the total or available storage capacity of the data storage system, the performance capabilities of the data storage system, and so forth. The characteristic(s) may also include a complexity of the job, such as the number of join operations included in the job, and so forth. In some implementations, the characteristics may include volumetric information regarding the previously run jobs, such as a number of rows accessed by a job. For example, a job that previously accessed 10 million rows may be predicted to have a longer execution duration than a job that accessed 10 rows. The characteristics may also include whether a job reads from a data storage system, writes to a data storage system, or performs both reads and writes. In some cases, the characteristics may also include an analysis of other jobs that previously ran concurrently with the job on a same data storage system.

At 608, the execution duration for the data access job is predicted, describing a predicted execution duration 302 for at least one future execution of the data access job. In some implementations, the historical data accessed at 604 may be employed to predict an execution duration for the job. For example, if previous executions of the data access job averaged 1.5 hours in execution duration, the predicted execution duration 302 may be determined as 1.5 hours. The execution duration 302 may also be predicted based on the characteristic(s) determined at 606. For example, if previous executions of the data access job averaged 1.5 hours on a first data storage system 126 that has substantially twice the job execution speed compared to a second data storage system 126, the predicted duration 302 of 3 hours may be determined for a future execution of the job on the second data storage system 126.

At 610, a determination is made whether there are additional data access jobs to analyze and for which to predict execution duration. If so, the process may return to 602. If not, the process may proceed to 612. At 612, the data access job scheduling may proceed as described above, based at least partly on the predicted execution duration(s) 302 determined by the process.

Figure 7:
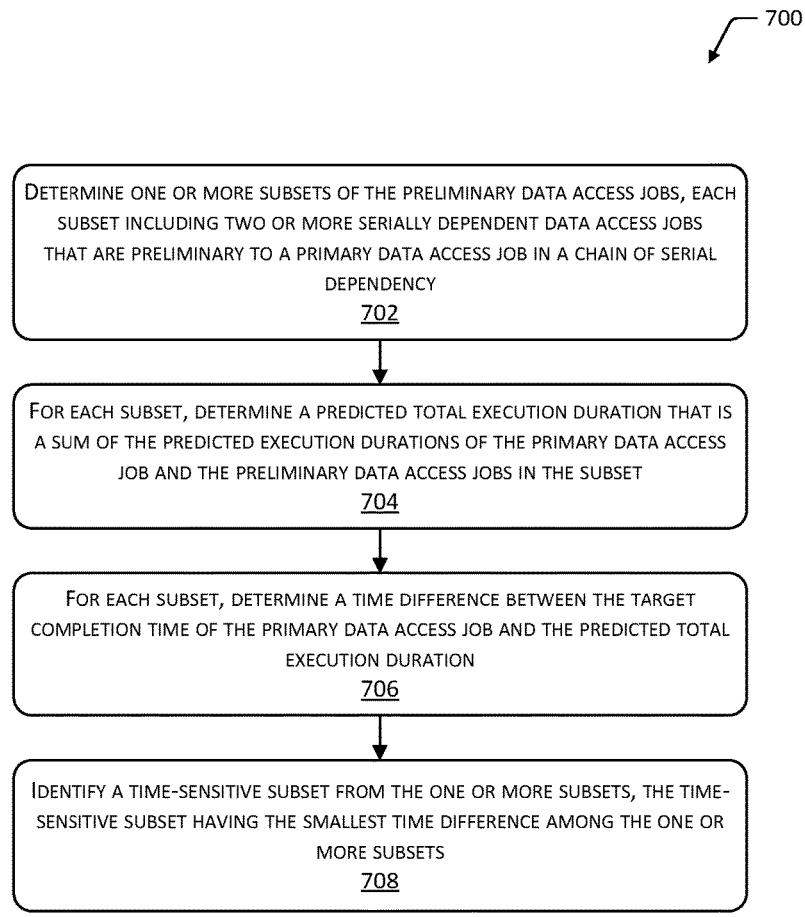
FIG. 7 depicts a flow diagram of a process for identifying a time-sensitive subset of the preliminary data access jobs for a primary data access job, based on the predicted execution durations.

FIG. 7 depicts a flow diagram 700 of a process for identifying a time-sensitive subset 304 of the preliminary data access jobs 118 for a primary data access job 108, based on the predicted execution durations 302. One or more operations of the process may be performed on the scheduling server device(s) 106, by the job scheduling module 114, the job dependency analysis module 116, the prediction module 120, the job execution module 124, or by other modules.

At 702, a determination is made of one or more subsets of the preliminary data access jobs 118 that are preliminary to one or more primary data access jobs 108, as described above. In some cases, one or more of the preliminary data access jobs(s) 118 may be preliminary to multiple primary data access jobs 108, as shown in the example of FIG. 4.

At 704, for each subset a determination is made of a total execution duration that is a sum of the predicted execution durations 302 of the primary data access job 108 and its associated preliminary data access job(s) 118 in the subset. Such a determination may proceed as described above with reference to FIGS. 3 and 4.

At 706, for each subset a determination is made of a time difference between the target completion time 110 of the primary data access job 108 and the total execution duration relative to a baseline time (e.g., 0000 or midnight). Such a determination may proceed as described above with reference to FIGS. 3 and 4.

At 708, a time-sensitive subset 304 is identified for the primary data access job 108 as the subset having the smallest time difference among the one or more subsets. The identification may proceed as described above with reference to FIGS. 3 and 4.

Figure 8:
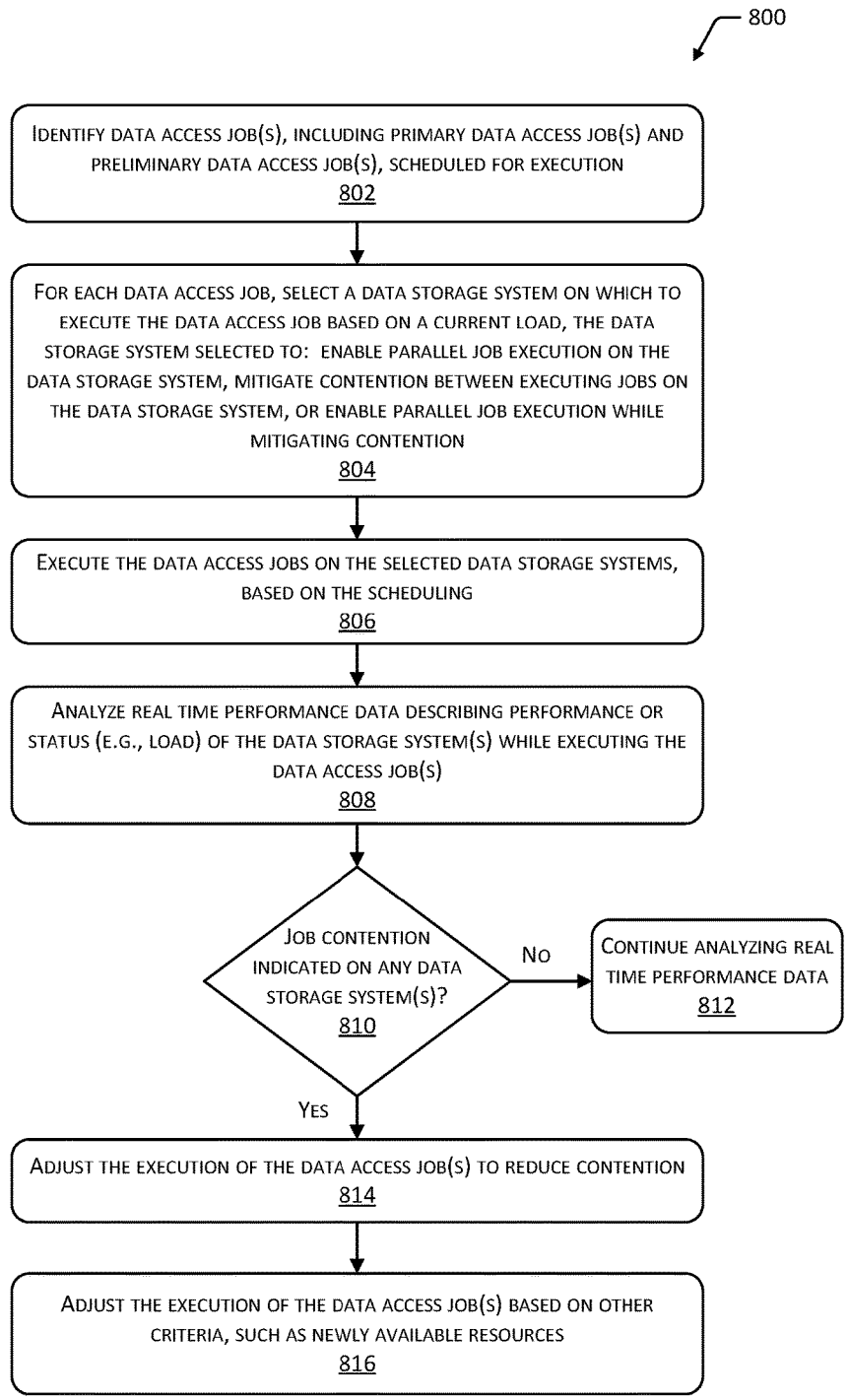
FIG. 8 depicts a flow diagram of a process for determining data storage systems on which to execute data access jobs, monitoring the execution, and adjusting execution based on monitored performance of the data storage systems.

FIG. 8 depicts a flow diagram 800 of a process for determining the data storage systems 126 on which to execute data access jobs, monitoring the execution, and adjusting execution based on monitored performance of the data storage systems 126. One or more operations of the process may be performed on the scheduling server device(s) 106, by the job scheduling module 114, the job dependency analysis module 116, the prediction module 120, the job execution module 124, or by other modules.

At 802, one or more data access jobs are identified as scheduled for execution. The identification may include primary data access job(s) 108, preliminary data access job(s) 118, or both. In some implementations, the identification may be based on the job scheduling data 122 generated by the job scheduling module 114.

At 804, for each data access job that is scheduled for execution, a data storage system 126 is selected on which to execute the data access job. In some cases, the data storage system 126 may be selected based on a current status of one or more data storage systems 126, such as a current processor load or usage, current memory usage, available storage, number of jobs currently executing, and so forth. In some implementations, the data storage system 126 may be selected to minimize of the possibility of parallel execution of jobs on the data storage system(s) 126. For example, jobs may be distributed among the data storage system(s) 126 such that no more than one job is executing on a data storage system 126 at a particular time, e.g., such that there is no contention or minimal contention on the data storage system 126.

As used herein, contention refers to circumstances when the execution in parallel of multiple data access jobs on a data storage system 126 negatively impacts the performance of the executing jobs causing them to execute more slowly than they would execute in the absence of contention. In such cases, the multiple jobs may be competing for limited resources such as processing power, active memory, or storage space on the data storage system 126, and such competition may degrade the system performance and lead to a long execution duration for at least one of the executing jobs.

In some cases, the data storage system 126 may be selected to enable parallel execution of multiple jobs on the data storage system 126, up to a point where the data storage system 126 exhibits contention. Some implementations may attempt to enable parallel execution of jobs while mitigating contention between executing jobs. In some implementations, the data access job request 104 may indicate a particular data storage system 126 on which the primary data access job 108 is requested to execute.

At 806, the data access jobs are scheduled on the selected data storage system(s) 126, according to the scheduling as described above.

At 808, performance data may be received describing the current (e.g., real time) performance of one or more data storage system(s) 126 while they are executing the scheduled data access job(s). Such data may be analyzed to determine whether contention is present on any of the data storage system(s) 126, or whether performance of the data storage system(s) 126 is such that the target completion time 110 may not be met for one or more primary data access jobs 108.

At 810, a determination is made whether job contention is indicated on any of the data storage system(s) 126. If not, the process may proceed to 812 and continue analyzing the real time performance data for the data storage system(s) 126. If so, the process may proceed to 814. At 814, based on the identification of contention the execution of the data access job(s) may be adjusted to reduce contention. In some cases, this may include rescheduling of jobs or moving scheduled jobs to a different data storage system 126.

At 816, the execution of one or more data access jobs may be adjusted based on other criteria. For example, a job currently executing on a data storage system 126 may be halted and restarted on a different data storage system 126 that has become newly available, based on a determination that the job may complete sooner on the different data storage system 126. Moreover, in some cases one or more data access jobs may be outside the management of the job scheduling module 114 or the job execution module 124. Such externally managed jobs may include high priority or critical jobs, or jobs that are managed by other groups within a larger organization. In such cases, information regarding the resource consumption and execution of such externally managed jobs may be available, and may be employed to adjust the execution of other, managed data access jobs. Implementations also support the use of other criteria to adjust the timing or data storage system for job execution.

Although the example operations 808, 810, 812, 814, and 816 describe the adjustment of currently executing data access jobs based on real time monitoring of job status, implementations are not so limited. In some implementations, one or more of the analyses described in FIG. 8 may be performed prior to launching one or more data access jobs. For example, implementations may determine that contention is likely on a particular data storage system 126 based on an analysis of multiple data access jobs scheduled to execute on the data storage system 126, and such a determination may be made prior to the start of one or more of the data access jobs. In such cases, implementations may reschedule one or more of the data access jobs to alter its start time, or reschedule one or more of the jobs to run on one or more different data storage systems 126, to mitigate the predicted contention.

Those having ordinary skill in the art will readily recognize that certain steps or operations illustrated in the figures above can be eliminated, combined, subdivided, executed in parallel, or taken in an alternate order. Moreover, the methods described above may be implemented as one or more software programs for a computer system and are encoded in one or more computer-readable storage media as instructions executable on one or more processors.

Separate instances of these programs may be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. For example, although the examples herein describe scheduling data access jobs, implementations may also be employed for scheduling other types of processes that execute in a computing environment. Moreover, implementations may be employed for scheduling other types of jobs or tasks, such as tasks involved in moving merchandise, supplies, or other tangible objects through a resource with limited capacity such as a warehouse, a loading dock, or a shipment processing center. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A computer-implemented method, comprising:
   receiving a job request, the job request including a primary data access job, one or more preliminary data access jobs, and a requested completion time for the primary data access job;
   determining execution durations of the primary data access job and the one or more preliminary data access jobs based on historical data describing execution durations for prior executions of the primary data access job and execution durations for prior executions of the one or more preliminary data access jobs;
   determining a target completion duration comprising a duration between an earliest start time for initiating execution of the one or more preliminary data access jobs and the requested completion time;
   determining one or more subsets of the one or more preliminary data access jobs, wherein individual ones of the one or more subsets include serially dependent preliminary data access jobs and are characterized by an execution duration, and each of the one or more subsets of the serially dependent preliminary data access jobs combined with the primary data access job are characterized by a total execution duration;
   identifying a first subset of the one or more subsets of the one or more preliminary data access jobs as a time-sensitive subset having a smallest time difference between the target completion duration and the total execution duration of the serially dependent preliminary data access jobs;
   scheduling start times for the primary data access job and the time-sensitive subset to begin execution such that the time-sensitive subset is given priority for start times over start times for a second subset of the one or more subsets;
   executing the time-sensitive subset at the scheduled start times for the one or more preliminary data access jobs in the time-sensitive subset;
   providing result data of the one or more preliminary data access jobs in the time-sensitive subset to the primary data access job prior to the scheduled start time of the primary data access job;
   begin executing the primary data access job by the scheduled start time so the primary data access job completes at or before the requested completion time, the primary data access job generating output data in response to the job request; and
   adjusting a start time for the at least one of the one or more preliminary data access jobs in the time-sensitive subset based on real time monitoring of status of the one or more preliminary data access jobs in the time-sensitive subset.

2. The method of claim 1, wherein the scheduling of the start times for the primary data access job and the one or more preliminary data access jobs in the time-sensitive subset is based on a priority rating included in the job request.

3. The method of claim 1, wherein the time-sensitive subset includes a first preliminary data access job that does not depend on prior execution of another preliminary data access job and a start time precedes the target completion duration by at least the total execution duration.

4. The method of claim 1, wherein the serially dependent preliminary data access jobs include at least a first preliminary data access job that executes after execution of at least a second preliminary data access job.

5. A system, comprising:
    at least one memory storing computer-executable instructions; and
    at least one processor in communication with the at least one memory, the at least one processor configured to access the at least one memory and execute the computer-executable instructions to:
        receive a job request that includes a primary data access job, one or more preliminary data access jobs, and a requested completion time for the primary data access job;
        predict an execution duration of the primary data access job and execution durations of the one or more preliminary data access jobs based on historical job execution data describing prior execution durations for the primary data access job and prior execution durations for the one or more preliminary data access jobs;
        determine a target completion duration comprising a duration between an earliest start time for initiating execution of the one or more preliminary data access jobs and the requested completion time;
        determine one or more subsets of the one or more preliminary data access jobs, wherein individual ones of the one or more subsets include serially dependent preliminary data access jobs characterized by an execution duration and each of the one or more subsets of the serially dependent preliminary data access jobs combined with the primary data access job are characterized by a total execution duration;
        determine a first subset of the one or more subsets of the one or more preliminary data access jobs as a time-sensitive subset of the one or more subsets of the one or more preliminary data access jobs having a smallest time difference between the target completion duration and the total execution duration;
        schedule a start time for at least one of the one or more preliminary data access jobs in the time-sensitive subset to begin execution such that the time-sensitive subset is given priority for start times over start times for a second subset of the one or more subsets and upon completion of the execution of the one or more preliminary data access jobs in the time-sensitive subset to provide result data of the one or more preliminary data access jobs in the time-sensitive subset to the primary data access job prior to the scheduled start time of the primary data access job so the primary data access job completes by the requested completion time; and
        adjust the scheduling of the start time for the at least one of the one or more preliminary data access jobs in the time-sensitive subset based on real time monitoring of status of the one or more preliminary data access jobs in the time-sensitive subset.

6. The system of claim 5, the at least one processor further configured to:
    determine one or more of a plurality of data storage systems on which to execute the primary data access job and the one or more preliminary data access jobs in the time-sensitive subset, to at least mitigate contention between the one or more preliminary data access jobs in the time-sensitive subset and one or more preliminary data access jobs not in the time-sensitive subset executing on the one or more of the plurality of data storage systems.

7. The system of claim 5, the at least one processor further configured to:
    determine one or more of a plurality of data storage systems on which to execute the primary data access job and the one or more preliminary data access jobs in the time-sensitive subset; and
    modify selection of the one or more of the plurality of data storage systems to execute at least one of the one or more preliminary data access jobs that is not in the time-sensitive subset on a data storage system becoming available to enable parallel job execution and mitigate contention between executing jobs on one or more of the plurality of data storage systems.

8. The system of claim 5, wherein the execution durations are predicted based on at least one characteristic of data access operations performed by the primary data access job or at least one of the one or more preliminary data access jobs.

9. The system of claim 5, wherein the predicting of the execution durations is further based on at least one characteristic of at least one data storage system on which the primary data access job or the one or more preliminary data access jobs was previously executed.

10. The system of claim 5, wherein the historical data describing the execution durations for prior executions of the primary data access job indicates that the primary data access job depends on the one or more preliminary data access jobs.

11. The system of claim 5, the at least one processor further configured to:
    detect job contention on one or more data storage systems, based at least on monitored real time performance of the one or more data storage systems; and
    wherein the adjusting of the scheduling of the execution of the at least one of the one or more preliminary data access jobs reduces the job contention.

12. The system of claim 5, wherein at least one of the one or more preliminary data access jobs is also preliminary to another primary data access job.

13. The system of claim 5, wherein:
    the job request further comprises a priority rating associated with the primary data access job; and
    the scheduling of the start times for the primary data access job and the one or more preliminary data access jobs in the time-sensitive subset is further based on the priority rating.

14. The system of claim 5, wherein:
    the time-sensitive subset includes a first preliminary data access job that does not depend on prior execution of another preliminary data access job; and
    the scheduling of the start time includes scheduling a start time for the first preliminary data access job such that the start time for the first preliminary data access job precedes the target completion duration by at least the total execution duration.

15. One or more non-transitory computer-readable media storing instructions which, when executed by at least one processor, instruct the at least one processor to perform actions comprising:
  receiving a job request that includes a primary data access job, one or more preliminary data access jobs, and a requested completion time for the primary data access job;
  in response to receiving the job request, identifying one or more preliminary data access jobs to be executed prior to execution of the primary data access job, the primary data access job accessing result data from at least one of the one or more preliminary data access jobs;
  based on historical data describing execution durations for prior executions of the primary data access job and execution durations for prior executions of the one or more preliminary data access jobs, predicting an execution duration of the primary data access job and execution durations for the one or more preliminary data access jobs;
  determining a target completion duration comprising a duration between an earliest start time for initiating execution of the one or more preliminary data access jobs and the requested completion time;
  determining one or more subsets of the one or more preliminary data access jobs, wherein individual ones of the one or more subsets include serially dependent preliminary data access jobs and are characterized by an execution duration that is a sum of the predicted execution durations of the serially dependent preliminary data access jobs of a subset of the one or more subsets, and each of the individual ones of the subsets combined with the primary data access job are characterized by a total execution duration;
  determining a first subset of the one or more subsets of the one or more preliminary data access jobs as a time-sensitive subset having a smallest time difference between the target completion duration and the total execution duration of the individual ones of the subsets;
  scheduling start times for the time-sensitive subset to begin execution such that the time-sensitive subset is given priority for start times over start times for a second subset of the one or more subsets and upon completion of execution of the time-sensitive subset to provide the result data of the time-sensitive subset to the primary data access job prior to the start time of the primary data access job to allow the primary data access job to complete by the requested completion time;
  executing the one or more preliminary data access jobs, based at least on a prioritized scheduling of the at least one of the one or more preliminary data access jobs included in the time-sensitive subset; and
  adjusting the scheduling of the start time for the at least one of the one or more preliminary data access jobs in the time-sensitive subset based on real time monitoring of status of the one or more preliminary data access jobs in the time-sensitive subset.

16. The one or more non-transitory computer-readable media of claim 15, wherein:
  the predicting of the execution durations is further based on at least one characteristic of at least one data storage system on which the primary data access job or the one or more preliminary data access jobs was previously executed.

17. The one or more non-transitory computer-readable media of claim 15, the actions further comprising:
  detecting job contention on one or more data storage systems, based at least on real time performance of the one or more data storage systems; and
  wherein the adjusting of the scheduling of the start time of the at least one of the one or more preliminary data access jobs reduces the job contention.

18. The one or more non-transitory computer-readable media of claim 15, wherein the execution durations are predicted based on at least one characteristic of data access operations performed by the primary data access job or at least one of the one or more preliminary data access jobs.

19. The one or more non-transitory computer-readable media of claim 15, wherein:
  the job request includes a priority rating associated with the primary data access job; and
  the scheduling of at least one of the preliminary data access jobs is based on prioritizing at least one of the preliminary data access jobs included in the time-sensitive subset to execute prior to at least one other preliminary data access job not included in the time-sensitive subset and on the priority rating associated with the primary data access job.

20. The one or more non-transitory computer-readable media of claim 15, wherein the serially dependent preliminary data access jobs include at least a first preliminary data access job that depends on prior execution of at least a second preliminary data access job.

* * * * *